Feb. 21, 1928.

L. H. THOMPSON

WARMER FOR LITTLE PIGS

Filed July 16, 1926

1,659,618

Inventor,
Leroy H. Thompson, by
G. C. Kennedy.
Attorney.

Patented Feb. 21, 1928.

1,659,618

UNITED STATES PATENT OFFICE.

LEROY H. THOMPSON, OF CEDAR FALLS, IOWA.

WARMER FOR LITTLE PIGS.

Application filed July 16, 1926. Serial No. 122,823.

My invention relates to means for warming inclosures, and the object of my improvements is to provide a warming device constructed to be removably mounted in a depressed seat in a floor and with a heat conducting top adapted to warm little pigs or other infantile animals or poultry as segregated from larger animals in the same pen or building.

This object I have accomplished by the means which are hereinafter described and claimed, and which are illustrated by the accompanying drawings, it being understood that modifications in dimensions, shape or arrangement are nevertheless covered within the scope of my invention.

Figure 1:
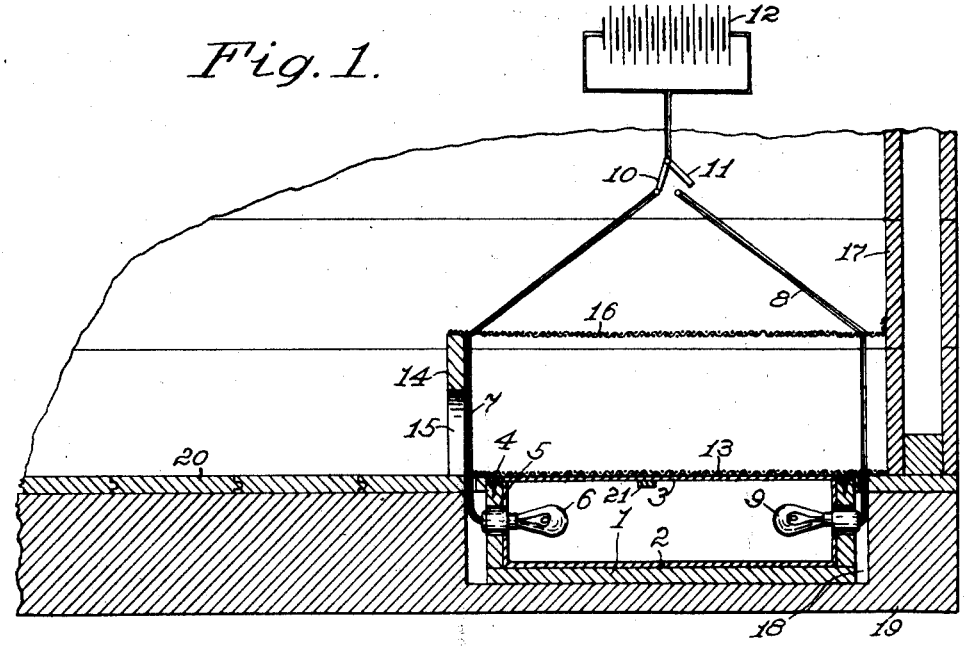
Figure 2:
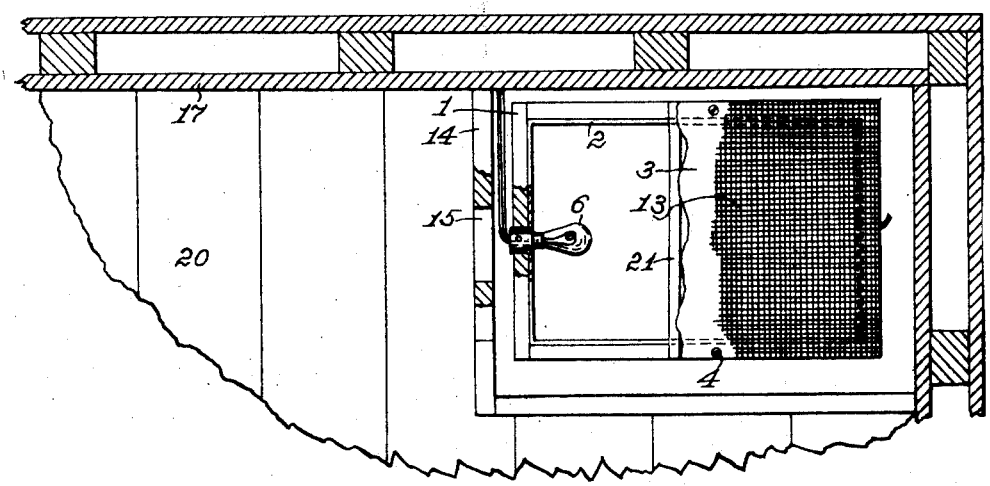

In said drawings Fig. 1 is a partial vertical section of a building containing my improved warming device also in section, medially and longitudinally. Fig. 2 is a partial top plan and horizontal section of said building and said warming device, with parts removed.

My said device has been found to be particularly useful for warming little pigs during their earlier stage of growth, during cold weather.

The numeral 17 denotes walls of a building or pen having a wood flooring 20 covering a concrete base 19, said flooring and a part of the concrete being removed to provide a depressed place or pit 18 in the concrete to admit a hollow box 1 with its top cover 3 flush with the top of the floor 20 without it.

This box 1 may be of any shape or size and nearly fills said pit 18. Its cover 3 is preferably made of sheet iron fastened thereon removably by means of screws 4 or other means, and the middle of the sheet 3 may be prevented from sagging by a cross-bar support thereunder at 21.

The box may be lined along its inner walls and bottom by a layer of heat insulating material 2. A top layer of porous matting such as burlap may be mounted upon the plate 3 at 13 to afford better footing for pigs than the smooth metal, besides being more comfortable. Holes 5 are placed in side walls of said box within which to mount the socket parts of electric lamps 6 which are thus bracketed within the box. The numeral 12 denotes a source of electric current which may be placed in circuit with either or both of the lamps 6 by means of conductors 7 and 8 and separate switches 10 and 11 respectively. Thus the heat may be regulated conveniently.

In a hog-house provided for a sow or sows and their litters, it is desirable to provide means for segragating the little pigs upon the warming device, to prevent the larger animals from interfering. I therefore usually supply an inclosure 14 around the embedded plate 3, the inclosure having a small portal 15 to admit the litter only. The open top of this inclosure may be covered by a layer of burlap or other loosely woven material as at 16. This tends to measurably hold in the heat while permitting ventilation therethrough.

The inclosure may be of any shape and size desired, and may be merely a ported board inclosing diagonally a corner part of the floor within which the warming device is stationed. Any desired number of lamps 6 may be used, and arranged differently as desired.

Having described my invention, what I claim as new, and desire to secure by Letters Patent, is:

A warmer for little pigs, comprising in combination, a housing, having a floor depression, a chamber removably mounted in said depression, having a removable flat metal plate top and having a non-conductive lining for the bottom and side walls, a cover of textile fabric for said metal plate, the top of said chamber being substantially flush with the floor of the housing, incandescent electric lamps in said chamber in controlled circuit with a source of electric current, an open top inclosure around said chamber, and a textile open-work fabric covering the interspace of the inclosure at the top, said inclosure having a portal at the floor of the housing of a size limited to permit the young of animals passage into the inclosure while barring passage through the portal of adults of the species.

In testimony whereof I affix my signature.

LEROY H. THOMPSON.